INVENTOR.
HARALD LORENZ
BY Henry J. R. Metzler
ATTORNEY

May 24, 1960 H. H. LORENZ 2,937,633
MECHANICALLY OPERATED CIRCULAR ECCENTRIC
VALVE ACTUATING MECHANISM
Filed June 3, 1958 2 Sheets-Sheet 2
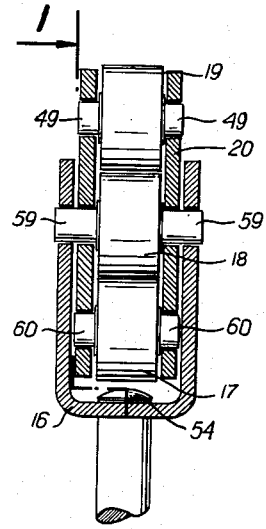
FIG. 2
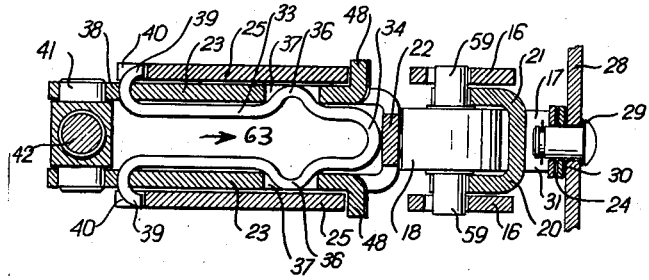
FIG. 3
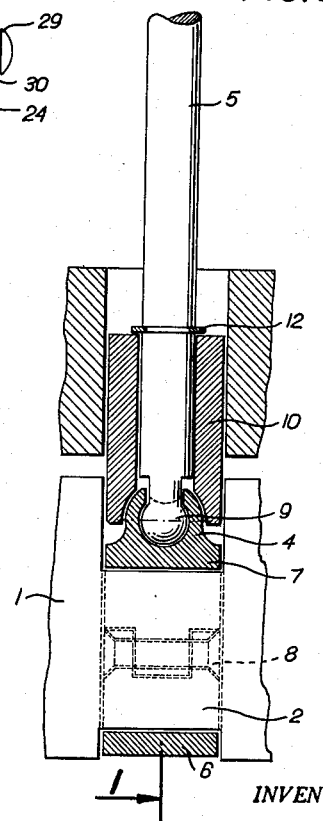
INVENTOR.
HARALD LORENZ
BY *Henry J. D. Metzler*
ATTORNEY.

United States Patent Office 2,937,633
Patented May 24, 1960

2,937,633
MECHANICALLY OPERATED CIRCULAR ECCENTRIC VALVE ACTUATING MECHANISM

Harald H. Lorenz, 414 S. 25th St., South Bend 15, Ind.

Filed June 3, 1958, Ser. No. 739,612

4 Claims. (Cl. 123—90)

The present invention relates to improvements in valve gears and valve actuating mechanisms for internal combustion engines, steam engines, compressors and for any other devices and machines using valves which are opened and closed at predetermined intervals automatically by the operation of the machine, or by any other suitable means. More specifically the invention relates to improvements of the valve gear disclosed by my Patent No. 2,832,327, dated April 29, 1958.

Although the use of my new and improved valve actuating mechanism is not limited to internal combustion engines, I have used, as example for herein describing and illustrating my invention, a valve arrangement for a modern V–8 automobile internal combustion engine.

One object of the present invention is the provision of a device of the character described which permits elimination of hydraulic valve lifters such as are used on standard engines, and which allows the use of one circular eccentric for the operation of each valve, and which also will reduce to a minimum the gradual opening and closing time of each valve, and will cause the valve to assume its maximum open position during the longest possible period of time at each one of those strokes which demands an opening of the valve.

Another object of the present invention is the provision of a device of the character described which does not require any valve actuating springs for the closing or opening of valves, thus greatly reducing the weight, the cost, the valve operating force and consequently the wear and tear, the possibility of breakdowns, and the necessity of repairs and adjustment of the valve actuating mechanism, and which also will make it possible to avoid valve tappet noises.

A further object of the present invention is the provision of a device of the character described which does not require any structural changes in the customary design of the cylinder block, the cylinder head, as well as the arrangement and dimensions of bearings, guide holes, and the like of an engine, and which is constructed in such a manner as to avoid expensive forging and grinding of a cam shaft, but which allows all parts of the valve actuating mechanism to be manufactured inexpensively by mass production processes such as pressing, casting or the like and to use primarily materials which are inexpensive or easy to work such as light metal, plastic materials, or the like.

Yet still another object of the present invention is the provision of a device of the character described in which only a straight up and down movement of the push rod for actuating each valve is carried out, and which can be assembled easily and within the shortest possible time, quickly, and which is constructed in such a manner that all moving parts are well lubricated during the operation of the machine.

With the foregoing and other objects in view which will appear as the description proceeds, the invention consists of certain novel details of construction and combinations of parts hereinafter more fully described and pointed out in the claims, it being understood that changes may be made in the construction and arrangements of parts without departing from the spirit of the invention as claimed.

In the accompanying drawings a preferred form of the invention has been shown.

In said drawings:

Fig. 2 is a detailed fractional vertical sectional view of a push rod arrangement on the line 2—2 of Fig. 1; and, Fig. 3 is a detailed fractional cross-sectional view of a rocker arrangement on the line 3—3 of Fig. 1.

Similar reference characters refer to similar parts throughout the several views.

Figure 1:
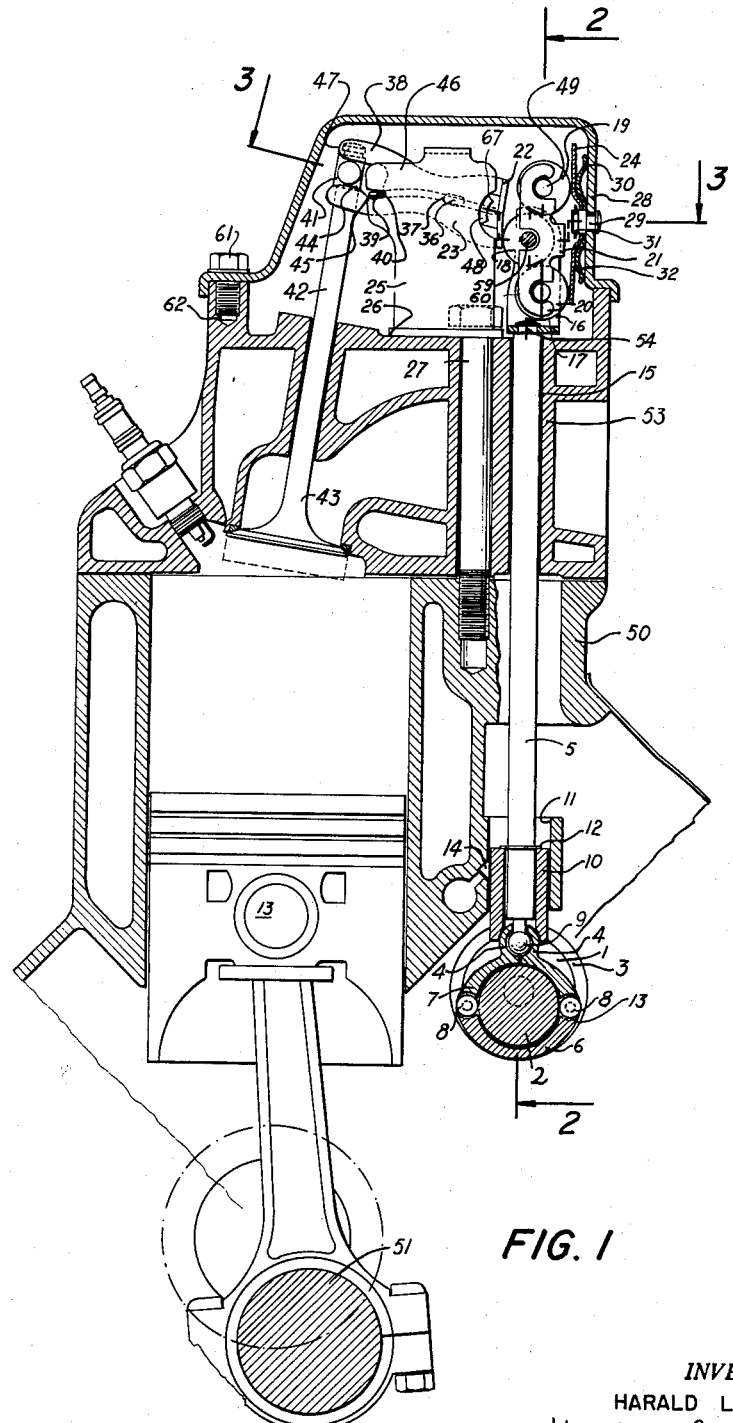
Figure 1 is a fractional vertical longitudinal sectional view of a preferred embodiment of my invention on the line 1—1 of Fig. 2.

In the drawings the numeral 1 denotes a valve actuating shaft, which is rotatably mounted in the cylinder block 50 of an engine, parallel to the engine crankshaft 51, and which may be forged similar to a crankshaft, but which—instead of crank portions—has eccentric portions 2, there being one eccentric portion 2 for each valve. The shaft 1, which according to my invention replaces a cam-shaft, rotates in any suitable bearing members 3, the same number of which may be provided on an engine as there would be cam-shaft bearings in an ordinary engine design. Upon rotation of the shaft 1 there will be reciprocated by the eccentric portions 2 for each valve a ball socket 4, which causes a push rod 5 to move up and down in an axial direction of the rod 5. A semi-circular shell member 6 is attached to a pair of quarter-circular shell members 7 by means of pins 8 or the like, so as to form a bushing 13 around each eccentric portion 2, and the members 7 have oppositely to each other disposed half-socket portions 4, to form with each other the aforementioned ball socket, which pivotally engages a ball portion 9 on one extremity of the rod 5. A tubular member 10, one end of which partially encompasses the outer side of the ball socket 4, is attached to a portion of the rod 5 adjacent the ball portion 9, and is slidable in a longitudinal lug portion 11 of the cylinder block 50, so as to form a guide for the lower end of the rod 5, to which the member 10 is secured by means of a retainer ring 12 or by any other suitable means. I prefer to provide a lubricant outlet 14 in the cylinder block 50 adjacent each member 10, so that the same may be properly provided with lubricant from the usual pressure lubrication system of the engine. Each rod 5 carries out one up and down movement at each revolution of the shaft 1, and its upper portion reciprocates in a bore 15 in a cylinder head 53. Such bores as the bore 15 are provided on modern standard internal combustion engines for automobiles and the like. The rod 5, which carries out a straight reciprocating movement along its longitudinal axis, like a piston rod of a steam engine, and which does not carry out any lateral swinging movements like a connecting rod of an internal combustion engine, can be made longitudinally adjustable for being used in connection with an inlet or an exhaust valve of an internal combustion engine, or it may be cut to a certain length according to the different requirements of the valve opening time, or the like.

The upper extremity 54 of the rod 5 is riveted or otherwise secured to the web portion of a first U-shaped bearing bracket member 16. Axle portions 59 of a roller 18 are rotatably extended through the flange portions of the member 16 and are preferably located thereon in such a manner that their axial center crosses the axial center of the rod 5.

A second U-shaped bracket member 20 is pivoted to the axle portions 59 and has its flange portions interposed between the roller 18 and the flange portions of the member 16. Axle portions 49 and 60 of rollers 19 and 17 respectively are pivoted to the flange portions of the member 20 at either side of the roller 18. Thus the member 20, with the rollers 17 and 19 pivoted thereto, is tiltable on the axle portions 59 relative to the member 16. The rollers 17, 18 and 19 can be made solid or hollow, and they may be made as units with their respective axle portions, which also may be tubular or solid.

The parts 16, 17, 18, 19, 20, 49, 59 and 60 constitute a roller arrangement which moves up and down when the rod 5 reciprocates, and there is provided in an engine one such rollers arrangement for each valve. While said roller arrangement is moving up and down, the roller 18 rolls on a base portion 22 of a rocker arm 23, whereas the rollers 17 and 19 roll on a cradle member 24. As may be seen in Fig. 1, the base portion 22 of the cradle member 23 consists of two substantially flat portions which are angularly disposed to each other at an obtuse angle, so as to form a substantially concave unit.

A third U-shaped bracket member 25 is welded or otherwise secured to a base plate 26 which is attached to the cylinder head 53 by means of the cylinder head bolts 27, which in the usual manner connect the head 53 to the cylinder block 50. A valve cover 28, which is similar to ordinary valve covers of standard internal combustion engines, but which preferably is distinguished from the same by more stock thickness and a slightly different design, encompasses the mechanical parts of my valve actuating mechanism on the cylinder head 53 and is attached thereto by the same bolts 61 engaging the same thread holes 62, as ordinary engine valve covers. The height of the cover 28 is the same as the height of ordinary valve covers on standard internal combustion engines.

A pin 29 which preferably has a shaft portion which is square in cross-section, or which has at least one flat side to prevent rotation in a correspondingly-shaped unround hole, is extended through a wall portion of the cover 28 as well as through the cradle member 24 and through a curved, longitudinal spring member 30 interposed between the inner side of the cover 28 and the cradle member 24, for the purpose of securing non-rotatably the members 24 and 30 to the cover 28. The spring member 30 serves as a cushioning means for the cradle member 24, which is tiltable on the cover 28. The member 30 can be replaced by rubber cushions or by any other suitable resilient means, or it can be eliminated in some cases, or it can be modified so as to be deflecting to one side only. The member 30 is an auxiliary spring which may be considered a fairly strong spring, just somewhat stronger than the force necessary for the opening or closing process of a valve. The spring member 30 provides no clearance between the rollers 17, 18, 19 and the base portion 22 respectively of the cradle member 24, but it will deflect in the shown arrangement with its arm portion 32 toward the valve cover 28 using the axle portions 49 of the roller 19 as a center of rotation, until heat causes an elongation of a valve stem 42, thus making unnecessary the use of hydraulic valve lifters such as have been used hitherto in standard engines. The arrangement of the valve stem 42 and of a valve 43, from which the stem 42 extends, can be the same as in standard engines and requires no changes on account of my new and improved mechanically operated circular eccentric valve actuating mechanism except those required for the cross-head 41.

In Fig. 1 the valve 43 is shown in closed position, and in this position the roller 19 remains approximately opposite to the connecting point between the cradle member 24 and the auxiliary spring 30, not causing any deflection; a roller 17 passed on its side the connecting point between the cradle member 24 and the spring 30 for the length of the travel of the roller arrangement (16 to 20), causing a longer lever arm and causing a deflection on this side of the spring member 30. The deflection of the member 30 is proportional to the varying length of the valve stem 42. In reverse, the same action of the spring 30 will reduce the applying force for the valve in maximum open position, so that a later described opening stop by a second auxiliary spring 33 is not unnecessarily enforced by the springload of the spring 30. While the member 30 may be referred to as a first auxiliary spring, a substantially U-shaped member 33 of spring steel or the like may be called a second auxiliary spring. This member 33 is not necessary for the principal function of my new and improved mechanically operated circular eccentric valve actuating mechanism; however, the member 33 has been found to be a very practical, inexpensive, light weight retainer member for keeping assembled the rocker arm 23, the U-shaped bracket member 25, and a cross head member 41 on the valve stem 42. These members can be assembled in a very simple and speedy manner by firstly pushing the member 33 into the rocker arm 23, in the direction of the arrow 63 (Fig. 3), until a web portion 34 of the member 33 rests against the inner side of the base portion 22 of the rocker arm 23, and the outwardly curved sections 36 of the flange portions of the member 33 snap into longitudinal holes 37 in the rocker arm 23. Thereupon, the rocker arm 23, with the spring member 33 assembled thereto, can be pushed with its end portion 38 firstly into the space between the flange portions of the U-shaped bracket member 25, thereby causing a deflection of a pair of hook-shaped extremities 39 of the member 33 toward the longitudinal center of the rocker arm 23, until the end portion 38 of the member 23 is connected to the cross-head member 41 and two outwardly extending extremities 48 of the rocker arm 23 engage inwardly curved edge portions 67 (Fig. 1) of the member 25, so as to be pivoted thereto; in the same moment the hook-shaped extremities 39 of the member 33 snap into slots 40 in the flange portions of the member 25. There will be a slight clearance between the bottom portions of the slots 40 and the ends of the hook-shaped extremities 39 of the spring 33, when the same is not deflected, but a deflection will fill out this clearance. Hence the member 33 is fastened to the rocker arm 23 in the direction of the lengthwise centerline thereof, and with the hook-shaped ends 39 to the member 25; the rocking of the rocker arm 23 will cause a deflection and a spring action of the member 33 between the extensions 36 and the hook shaped extremities 39. This is another purpose of the spring member 33. Since the neutral position is in the middle between the opened or closed position of the valve 43, there will be a spring force against the actuating force in each extreme position, assisting the stop in the end positions and assisting to accelerate at the beginning of the movement in a reversed direction. The spring load of the spring 33 must not be very high, but should be less than the spring load of the spring member 30. Still a further purpose of the spring member 33 is to assure a definitive stop of the valve 43 in the maximum open position. As shown, the end portion 38 of the rocker arm 23 has on the ends of the slots 44 for accommodating the cross member 41 a larger enlargement 45 on one side, than on the other side 46. This causes the hook-shaped extremities 39 of the spring 33 not to connect to the end portion 38 of the rocker arm 23 in the closed position of the valve 43. However, it might connect after maximum deflection of the spring 33 in the opened position by high opening and closing speed, thus stopping the opening movement definitively, but still with a slight deflection of the hook-shaped extremities 39 themselves, thus causing a minimum of noise.

As mentioned above, the valve 43 is standard in its main dimensions, with the modifications necessary for a cross member 41 and a retainer ring 47.

As will be obvious from the foregoing part of this specification, when the rod 5 moves upwardly the rocker arm 23 swings in a counter-clockwise direction, so that the valve 43 will be opened; when the rod 5 moves downwardly the rocker arm 23 swings in a clockwise direction, so that the valve 43 will be closed.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. A valve actuating mechanism comprising a valve actuating shaft having a circular eccentric portion for each valve to be actuated by said shaft, a rod provided for each eccentric portion of said shaft being constructed and arranged for being reciprocated by the same, guide means through which said rod is slidably extended, a first bracket member secured to said rod, a first roller rotatably mounted on said first bracket member, a second bracket member pivoted to said first roller, a pair of second rollers rotatably mounted on said second bracket member, a stationary third bracket member, a rocker arm pivoted to said third bracket member having a substantially concave base portion and having an end portion engaging a valve shaft, a stationary cover member encompassing said bracket members and said rocker arm, a cradle member secured to said cover member, and resilient means interposed between said cradle member and said cover member tending to force portions of said cradle member against said second rollers while said first roller engages the base portion of said rocker arm, so that a reciprocating movement of said rod will cause a swinging movement of said rocker arm.

2. A device of the character described comprising a valve actuating shaft having a circular eccentric portion for each valve and being rotatably mounted on a machine having valves, a rod provided for each eccentric portion of said shaft being constructed and arranged for being reciprocated by the same, guide means through which said rod is slidably extended being provided on said machine, a first bracket member secured to said rod, a first roller rotatably mounted on said first bracket member, a second bracket member pivoted to said first roller, a pair of second rollers rotatably mounted on said second bracket member, a rocker arm pivoted to said machine having a base portion consisting of sections which are angularly disposed to each other at obtuse angles and having also a slotted end portion, a cross-head member mounted on a valve shaft and being attached to the end portion of said rocker arm, a cover member secured to said machine, a cradle member tiltably secured to said cover member, and resilient means interposed between said cradle member and said cover member tending to force portions of said cradle member against said second rollers while said first roller engages the base portion of said rocker arm, so that a reciprocating movement of said rod will cause a swinging movement of said rocker arm.

3. In a machine having valves, a valve actuating mechanism comprising a shaft having an eccentric portion for each valve of the machine and being rotatably mounted on the machine, a rod provided for each eccentric portion of said shaft being constructed and arranged for being reciprocated by the same, a tubular member attached to one end of said rod near said shaft being slidably mounted on said machine, a U-shaped member having flange portions and a web portion which is secured to the other end of said rod, a first roller having shaft portions rotatably mounted on the flange portions of said U-shaped member, a bracket tiltably mounted to the shaft portions of said first roller, second rollers rotatably mounted on said bracket, a rocker member tiltably mounted on said machine having a substantially concave base portion and having also a slotted end portion, a cross-head member mounted on a shaft portion of a valve of said machine and being attached to the slotted portion of said rocker member, a cover member secured to said engine, a cradle member secured to said cover member, and resilient means interposed between said cradle member and said cover member tending to force portions of said cradle member against said second rollers while said first roller engages the base portion of said rocker member, said rollers being reciprocated between said rocker and cradle members through said rod by the rotation of said shaft, thereby causing the rocker member to move a valve of the machine.

4. In a machine having valves, a valve actuating mechanism comprising a shaft having an eccentric portion for each valve of the machine and being rotatably mounted on the machine, a ball socket member rotatably mounted on each eccentric portion of said shaft, a tubular member adjacent said ball socket member being slidably mounted on said machine, a rod to one end portion of which said tubular member is attached having a ball-shaped extremity engaged by said ball socket member, a plurality of rollers tiltably mounted relative to each other on the other end of said rod, a bracket member mounted on said machine, a rocker member pivoted to said bracket member having a base portion consisting of sections which are angularly disposed to each other at obtuse angles and having also an end portion pivoted to a valve of the machine, and a cradle member tiltably mounted to a stationary element of the machine, said rollers being interposed between said cradle member and the base of said rocker member so as to cause tilting movements of the rocker member when the rollers and said rod are reciprocated by the rotation of said shaft, thereby causing the rocker member to move the aforementioned valve of the machine.

References Cited in the file of this patent

UNITED STATES PATENTS

| | | |
|---|---|---|
| 1,309,339 | Reynolds | July 8, 1919 |
| 2,111,735 | Riley | Mar. 22, 1938 |
| 2,832,327 | Lorenz | Apr. 29, 1958 |